United States Patent
Döring

(10) Patent No.: US 9,167,827 B2
(45) Date of Patent: Oct. 27, 2015

(54) PROCESS FOR THE PRODUCTION OF CHEESE MILK

(71) Applicant: DMK Deutsches Milchkontor GmbH, Bremen (DE)

(72) Inventor: Sven-Rainer Döring, Zeven (DE)

(73) Assignee: DMK Deutsches Milchkontor GmbH, Zeven (DE)

(*) Notice: Subject to any disclaimer, the term of this patent is extended or adjusted under 35 U.S.C. 154(b) by 0 days.

(21) Appl. No.: 13/891,579

(22) Filed: May 10, 2013

(65) Prior Publication Data
US 2013/0302491 A1 Nov. 14, 2013

(30) Foreign Application Priority Data
May 11, 2012 (EP) .................................. 12167620

(51) Int. Cl.
A23C 3/02 (2006.01)
A23C 9/142 (2006.01)
A23C 3/03 (2006.01)
A23C 7/04 (2006.01)
A23C 19/05 (2006.01)

(52) U.S. Cl.
CPC . *A23C 9/142* (2013.01); *A23C 3/03* (2013.01); *A23C 7/046* (2013.01); *A23C 9/1422* (2013.01); *A23C 19/05* (2013.01); *A23C 2210/252* (2013.01); *A23C 2210/256* (2013.01)

(58) Field of Classification Search
CPC .......... A23C 9/142; A23C 3/03; A23C 7/046; A23C 19/05; A23C 9/1422
USPC .......... 426/580, 585, 478, 490, 491, 492, 495
See application file for complete search history.

(56) References Cited

U.S. PATENT DOCUMENTS

| | | | | |
|---|---|---|---|---|
| 4,344,970 A | * | 8/1982 | Zall et al. | 426/40 |
| 4,876,100 A | * | 10/1989 | Holm et al. | 426/491 |
| 5,401,523 A | * | 3/1995 | Degen et al. | 426/580 |
| 5,881,638 A | * | 3/1999 | Kjaerulff et al. | 99/453 |
| 2010/0323076 A1 | * | 12/2010 | Baer et al. | 426/520 |

FOREIGN PATENT DOCUMENTS

| | | |
|---|---|---|
| DE | 10036085 C1 | 1/2002 |
| DE | 102004039733 A1 | 3/2006 |
| DE | 102005007941 A1 | 8/2006 |
| DE | 102010037550 A1 | 3/2011 |
| EP | 2368437 A1 | 9/2011 |
| WO | 9636238 A1 | 11/1996 |
| WO | 0074495 A1 | 12/2000 |

* cited by examiner

*Primary Examiner* — Helen F Heggestad
(74) *Attorney, Agent, or Firm* — Dilworth & Barrese, LLP

(57) ABSTRACT

A process for the production of cheese milk is suggested, wherein
(a) raw milk is subjected to heat treatment,
(b) solids are removed from the heat-treated product,
(c) the resulting intermediate is skimmed,
(d) the skimmed milk such obtained is subjected to microfiltration, and
(e) the resulting permeate is adjusted to the desired fat contents by adding an amount of the cream separated in step (c), and the standardized milk such obtained is
(f) pasteurized in a final step.

12 Claims, 1 Drawing Sheet

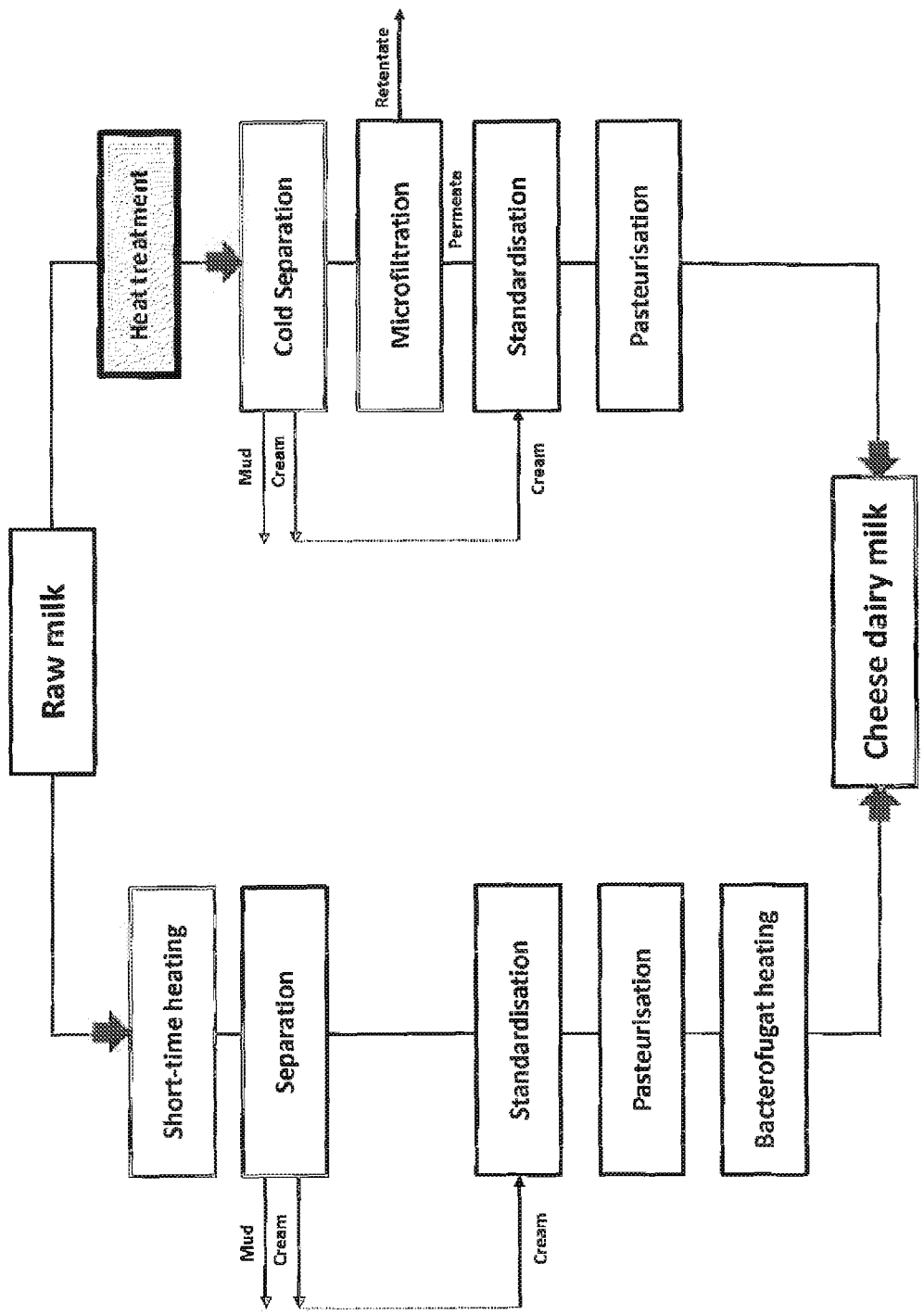

PROCESS FOR THE PRODUCTION OF CHEESE MILK

AREA OF THE INVENTION

The invention relates to the area of food technology and specifically relates to an improved process for the production of so-called cheese milk.

STATE OF THE ART

What is referred to as cheese milk is raw milk, which, after pasteurization and fat adjustment, is coagulated in order to produce cheese, but also yogurt. As, in former times, cheese was mostly produced in cheese vats—which, nowadays, is partly still typical for the production of Parmesan cheese—cheese milk is synonymously referred to as milk in the vat.

In order to be used for the production of cheese, raw milk needs to conform to legal requirements which are laid down in the Cheese Ordinance. Usually, the production process begins by heating the raw milk by heat exchange using heat carrier media under a simultaneous partial heat recovery. A separation into skimmed milk, cream and separator slime is usually performed in a pasteurization unit with an integrated separator. In doing so, heating is increased so far that a first thermization or pasteurization occurs. After subsequent standardization, the standardized milk is stored in a storage tank, and stored milk drawn from the storage tank is subjected to a second pasteurization by repeated heating.

This involves a significant disadvantage, which is that said pasteurization, which usually is carried out in a range of temperature of from 72 to 74° C. over a period of 15-30 seconds, only kills the vegetative bacteria present in the raw milk but not the thermo-resistant spores and thermoduric bacteria. During heat recovery following pasteurization, the milk passes a range of temperature of about 45° C., which exactly corresponds to the growth optimum of said remaining bacteria such that the spores remaining in the pre-treated milk vigorously reciprocate.

These bacteria may cause unusual fermentations and cheese defects during cheese maturing, for example, irregular holes. In addition, the whey drained during the production of cheese will contain a correspondingly high percentage of the thermo-resistant bacteria. As in whey-processing methods heating temperatures are used which are not sufficiently high enough, the thermo-resistant bacteria contained therein are undesired and may lead to a violation of specifications in the end products, particularly with respect to the number of bacteria.

For this reason, milk such pre-treated is usually subjected to a second thermal step (thermization) and is then passed through a bactofuge to reduce the number of bacteria as far as is necessary to comply with production and legal requirements. It is obvious that the double thermal treatment is technologically complex and energy-intensive, which burdens the economy of the whole process.

Processes are known from the state of the art, which intend to eliminate the disadvantages mentioned. For example, EP 2368437 A1 (Müller) proposes to carry out the separation process in a cold condition of the raw milk and to carry out heating only with standardized milk. Even though this process has energetic advantages, degermination is unsatisfactory.

US 2002 012732 A1 (Lindquist) discloses a process in which skimmed milk is subjected to filtration obtaining a permeate and a retentate. While the permeate undergoes a heat treatment, the retentate is filtered a second time. The second permeate such obtained is added to the first permeate. The process, however, proves to be far too complex in practice.

Subject matter of U.S. Pat. No. 6,372,276 B1 (Lindquist) is a process for the production of a sterile milk by firstly filtering raw milk and then thermally treating the permeate such obtained in a plurality of steps. However, in this process one often observes a plugging of the membranes, which leads to frequent interruptions of the continuous process and, in addition, bacteria numbers are not sufficiently reduced.

The object of the present invention was therefore to provide a standardized cheese milk or milk in the cheese vat, wherein all vegetative bacteria and all thermo-resistant spores are removed using a single thermal treatment step such that the remaining number of bacteria is below the legally permitted value and is acceptable from a production point of view.

DESCRIPTION OF THE INVENTION

Subject-matter of the invention is a process for the production of cheese milk, wherein
(a) raw milk is subjected to thermal treatment,
(b) solids are removed from the thermally treated product,
(c) the resulting intermediate is skimmed,
(d) the skimmed milk such obtained is subjected to microfiltration, and
(e) the resulting permeate is adjusted to yield the desired fat content by adding an amount of cream that was separated in step (c), and the standardized milk such obtained is
(f) pasteurized in a final step.

Surprisingly it was found that a microfiltration step downstream of pasteurization, not upstream, in sum results in a lower number of remaining bacteria and solves the problem of membrane clogging. In doing so, it has proved to be unnecessary to use membranes with pore diameters of below 0.5 μm. For a practical quantitative separation of the microorganisms, which have proved to be resistant against thermal treatment, a pore size of from 1.1 to 2 μm is completely sufficient, particularly when ceramic is used as membrane material. In doing so, the problem of clogging is simultaneously solved and a continuous mode of operation is ensured.

In addition, the process according to the invention has the advantage that the heating of raw milk is performed only once, directly before directing the cheese milk into the cheese vat, thus effecting the legally required pasteurization. Standardized milk such obtained does not need to be treated in a bactofuge.

BRIEF DESCRIPTION OF THE DRAWING

The present invention will be described in greater detail with reference to the accompanying drawing in which the sole FIGURE illustrates a conventional production of cheese milk (left-hand side branch) and process according to the invention (right-hand side branch).

DESCRIPTION OF THE PREFERRED EMBODIMENTS

Thermal Treatment

The thermal treatment of raw milk ("degermination") is preferably carried out in heat exchangers, whereby specifically plate heat exchangers have proved to be particularly suitable. There is a temperature gradient at the heat exchangers, which, however, is selected such that the raw milk is heated to a temperature of from about 70 to 80° C. and, more particularly, from about 72 to 74° C. for a residence time of a minimum of 20 and a maximum of 60 seconds, preferably, about 30 seconds.

The separation of solids ("cheese fines") and the skimming of a fat content of about 4% by weight is usually carried out in a downstream component, preferably, a separator. Said components are adequately known from the state of the art. Separators of the company GEA Westfalia Separator GmbH, which allow the joint or single use of both steps (http://www.westfalia-separator.com/de/anwendungen/molkereitechnik/milch-molke.html) are widely used in milk industry. Corresponding components have been disclosed, for example, in DE 10036085 C1 (Westfalia), and are perfectly known to one skilled in the art. Thus no explanations are needed on carrying out these process steps, as they are understood to be part of the general specialist knowledge.

Microfiltration

Microfiltration is a process for substance removal. The essential difference between microfiltration and ultrafiltration lies in the different pore sizes and the different membrane structure as well as in the materials and filter materials involved. A filtration through membranes having a pore size <0.1 µm is usually referred to as ultrafiltration, while a filtration using pore sizes >0.1 µm is usually referred to as microfiltration. In both cases purely physical, i.e. mechanical membrane separation methods, which apply the principle of mechanical size exclusion, are concerned: all particles in the fluids, which are larger than the membrane pores, are held back by the membrane. The driving force in both separation methods is the differential pressure between the inlet and the outlet of the filter area, which is between 0.1 and 10 bar. The filter area material may consist of—depending on the area of application—stainless steel, synthetic material, ceramic or textile fabric. Filter elements appear in different forms: candle filters, flat membranes, spiral coil membranes, bag filters and hollow fibre modules; all of them are principally suitable within the meaning of the present invention.

In milk technology there has been a prejudice according to which pore diameters should not fall below a value of 0.5 µm to separate microorganisms in raw milk. However, this invention includes the insight that a diameter in the range of from 1.1 to even 2 µm and, preferably, 1.3 to 1.5 µm is completely sufficient if the majority of thermo-labile bacteria has been separated before by a corresponding thermic treatment and subsequently discharged together with the separator slime. The combination of this comparably larger pore diameter with a microfiltration device, which essentially comprises a ceramic membrane, solves the problem of frequent clogging at the same time.

Standardization

The cream which is to be added to the skimmed milk separated from the raw milk for standardization purposes may be taken from the cream that has been separated from it before. In addition, or as an alternative, the cream which is to be added may also be taken from other processes in which whey cream is received, particularly from dairy processing. Further, by means of adding a certain amount of protein, which, for example, may be taken from another dairy process, also the protein content may be standardized during standardization.

A significant further development of the process according to the invention is that a bacteria concentrate is separated from the standardized milk. In doing so, the portion of bacteria which is prejudicial as to the quality of the cheese milk is further reduced. Said separation may be carried out by a known centrifugation separation, which is either a 1-step or a 2-step process. However, due to the separation of the raw milk in a cold condition in connection with modern degermination technology applied in the process according to the invention, the amount of resulting bacteria concentrate is so small that no further processing is needed. It is discharged from the process and removed without any economic losses.

Within the limits of the invention it is further provided that the standardized milk is stored before it is pasteurized. By means of storing in a milk storage tank it is possible to generate, if necessary, a residence time, if the cheese to be produced requires so. Pasteurization itself may be carried out in the same conditions as the first short-time heating described above. The particular advantage of the process is, as described, that any further thermal treatment and removal of bacteria in a bactofuge are no longer necessary. As, from an energetic perspective, microfiltration can be carried out much more efficiently than removal using a bactofuge, the economic advantage of the process according to the invention is obvious.

Process Description

The invention is explained in more detail by the sole FIGURE below, which reflects the process as a flow chart.

The left-hand side branch of the chart describes the conventional production of cheese milk. During this process, raw milk is firstly subjected to short-time heating and then, when it is in a heated condition, it is separated from slime in a separator. Skimming is performed at the same time. The skimmed milk obtained is now adjusted to a defined fat content using a certain amount of cream ("standardized") and subsequently pasteurized, i.e., it is heated up to a temperature of from 72 to 74° C. for about 30 seconds. To separate the spores formed during the two heating steps, further mechanical separation is then carried out in a bactofuge. The bacteria concentrate is removed and the pasteurized milk is placed, for example, into a cheese vat for further processing.

The branch in the right-hand side of the FIGURE describes the process according to the invention. The raw milk is, as above, firstly subjected to short-time heating and then, when it is in a heated condition, it is separated from slime in a separator. Skimming is performed at the same time. Separation is followed by microfiltration, during which not only vegetative bacteria, but also spores are retained in the retentate while the permeate undergoes further processing. Part of the cream is then added back to the permeate to adjust a defined fat content. This is followed by pasteurization; further processing in a bactofuge, however, is no longer necessary, i.e. the standardized cheese milk may be passed directly into the cheese vat.

The invention claimed is:

1. A process for the production of cheese milk, comprising the steps of
    (a) subjecting raw milk to heat treatment at a temperature in the range of from 70° C. to 80° C. and over a time period range of from 20 seconds to 60 seconds to obtain a thermally treated product,
    (b) removing solids from the thermally treated product to obtain an intermediate,
    (c) skimming the resulting intermediate to obtain a cream and a skimmed milk,
    (d) subjecting the thus-obtained skimmed milk to microfiltration using a membrane with an average pore size of about 1.3 to 1.5 µm, to produce a permeate and retentate,
    (e) adjusting the resulting permeate to the desired fat content by adding an amount of the cream separated in step (c) to obtain a standardized milk, and
    (f) pasteurizing the standardized milk in a final step.

2. The process of claim 1, wherein the standardized milk is not subjected to treatment in a bactofuge.

3. The process of claim 1, wherein the heat treatment is carried out in a heat exchanger.

4. The process of claim 1, wherein the solids are separated in a separator.

5. The process of claim 1, wherein the membrane is a ceramic membrane.

6. The process of claim 1, wherein during step (e) the added cream is taken from the separated cream.

7. The process of claim 1, wherein during step (e) the added cream is taken from a whey cream received in a whey process.

8. The process of claim 1, wherein during step (e) a metered quantity of a protein obtained in a dairy process is added.

9. The process of claim 1, wherein a bacteria concentrate is separated from the standardized milk.

10. The process of claim 1, wherein separation is performed by centrifugation.

11. The process according to claim 1, wherein the standardized milk is stored before it is pasteurized.

12. The process of claim 1, wherein the standardized milk is pasteurized at temperatures within the range of from 70 to 80° C. and for a period of from 20 to 60 seconds.

\* \* \* \* \*